(12) United States Patent
Chen

(10) Patent No.: US 9,503,855 B2
(45) Date of Patent: Nov. 22, 2016

(54) TERMINAL APPARATUS, POSITION ESTIMATING METHOD, POSITION ESTIMATING SYSTEM, AND COMPUTER-READABLE STORAGE MEDIUM

(71) Applicant: FUJITSU LIMITED, Kawasaki-shi, Kanagawa (JP)

(72) Inventor: Bin Chen, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/830,012

(22) Filed: Aug. 19, 2015

(65) Prior Publication Data
US 2015/0358781 A1 Dec. 10, 2015

Related U.S. Application Data

(63) Continuation of application No. PCT/JP2013/059237, filed on Mar. 28, 2013.

(51) Int. Cl.
| | |
|---|---|
| H04W 24/00 | (2009.01) |
| H04W 4/02 | (2009.01) |
| H04W 64/00 | (2009.01) |
| G01S 5/02 | (2010.01) |
| G01S 5/14 | (2006.01) |

(52) U.S. Cl.
CPC ............ *H04W 4/023* (2013.01); *G01S 5/0278* (2013.01); *G01S 5/14* (2013.01); *H04W 64/00* (2013.01)

(58) Field of Classification Search
CPC ....... H04W 64/00; H04W 4/02; H04W 4/22; H04W 4/04; H04W 64/003; H04W 64/006; H04W 4/023; H04W 4/021; H04W 4/025; G01S 5/00

USPC .......................................... 455/456.1–456.6
See application file for complete search history.

(56) References Cited

U.S. PATENT DOCUMENTS

| | | | |
|---|---|---|---|
| 2003/0130793 A1* | 7/2003 | Patwari | H04W 64/00 701/300 |
| 2004/0162090 A1* | 8/2004 | Suryanarayana | H04W 64/00 455/456.5 |
| 2010/0120422 A1 | 5/2010 | Cheung et al. | |
| 2012/0115510 A1 | 5/2012 | Denby et al. | |

FOREIGN PATENT DOCUMENTS

| | | |
|---|---|---|
| JP | 2008-547355 | 12/2008 |
| JP | 2010-239331 | 10/2010 |
| JP | 2011-179946 | 9/2011 |

(Continued)

OTHER PUBLICATIONS

EESR—Extended European Search Report dated Mar. 16, 2016 issued with respect to the corresponding European Patent Application No. 13880249.1.

(Continued)

*Primary Examiner* — Olumide T Ajibade Akonai
(74) *Attorney, Agent, or Firm* — Fujitsu Patent Center

(57) ABSTRACT

A mobile terminal communicable with a plurality of base stations narrows down candidate positions of the mobile terminal estimated from signals received from the plurality of base stations, based on missing data of the signals received from a certain base station, and estimates a position of the mobile terminal from the narrowed down candidate positions, based on an observation probability of intensities of the signals received.

14 Claims, 17 Drawing Sheets

(56) References Cited

FOREIGN PATENT DOCUMENTS

| JP | 2012-529635 | 11/2012 |
|---|---|---|
| WO | 2007/001660 | 1/2007 |
| WO | 2010/106530 A2 | 9/2010 |
| WO | 2010/142615 | 12/2010 |

OTHER PUBLICATIONS

Teemu Roos et al., "A Probabilistic Approach to WLAN User Location Estimation", International Journal of Wireless Information Networks, vol. 9, No. 3, Jul. 2002, pp. 155-164 (10 pages).

Ville Honkavirta et al., "A Comparative Survey of WLAN Location Fingerprinting Methods", Proc. of the 6th Workshop on Positioning, Navigation and Communication 2009 (WPNC '09), pp. 243-251 (9 pages).

Mohamed M. Atia et al., Dynamic Online-Calibrated Radio Maps for Indoor Positioning in Wireless Local Area Networks, IEEE Transactions on Mobile Computing, IEEE Transactions on Journal Name, Manuscript ID, Jun. 26, 2012, Issue: 99, paragraph 4, pp. 1-14 (14 pages).

International Search Report and Written Opinion of the International Searching Authority (Form PCT/ISA/210, Form PCT/ISA/237), mailed in connection with PCT/JP2013/059237 and mailed Jun. 4, 2013, English translation (7 pages).

* cited by examiner

FIG.4

| AP NUMBER | MAC ADDRESS OF AP | COVERAGE LOCATION LIST OF AP | | | |
|---|---|---|---|---|---|
| 1 | M1 | LOCATION NAME L1 | LOCATION NAME L2 | LOCATION NAME L3 | ...... |
| 2 | M2 | LOCATION NAME L1 | LOCATION NAME L2 | LOCATION NAME L3 | ...... |
| ... | ... | ... | ... | ... | ... |

| LOCA-TION NUMBER | LOCA-TION NAME | THRESH-OLD VALUE | OBSERVABLE AP LIST ||||||||||||
|---|---|---|---|---|---|---|---|---|---|---|---|---|---|---|
| | | | MAC ADDRESS |||||MAC ADDRESS|||||MAC ADDRESS||
| | | | MISSING PROBA-BILITY | OBSER-VATION PROBA-BILITY | OBSERVATION PROBABILITY FOR DIFFERENT INTENSITY LEVELS ||| MISSING PROBA-BILITY | OBSER-VATION PROBA-BILITY | OBSERVATION PROBABILITY FOR DIFFERENT INTENSITY LEVELS ||| MISSING PROBA-BILITY | OBSER-VATION PROBA-BILITY | OBSERVATION PROBABILITY FOR DIFFERENT INTENSITY LEVELS |
| | | | | | 1 2 | 3 | 4 | | | 1 2 | 3 | 4 | | | 1 2 3 4 |
| 1 | L1 | | | | | | | | | | | | | | |
| 2 | L2 | | | | | | | | | | | | | | |
| ... | | | | | | | | | | | | | | | |

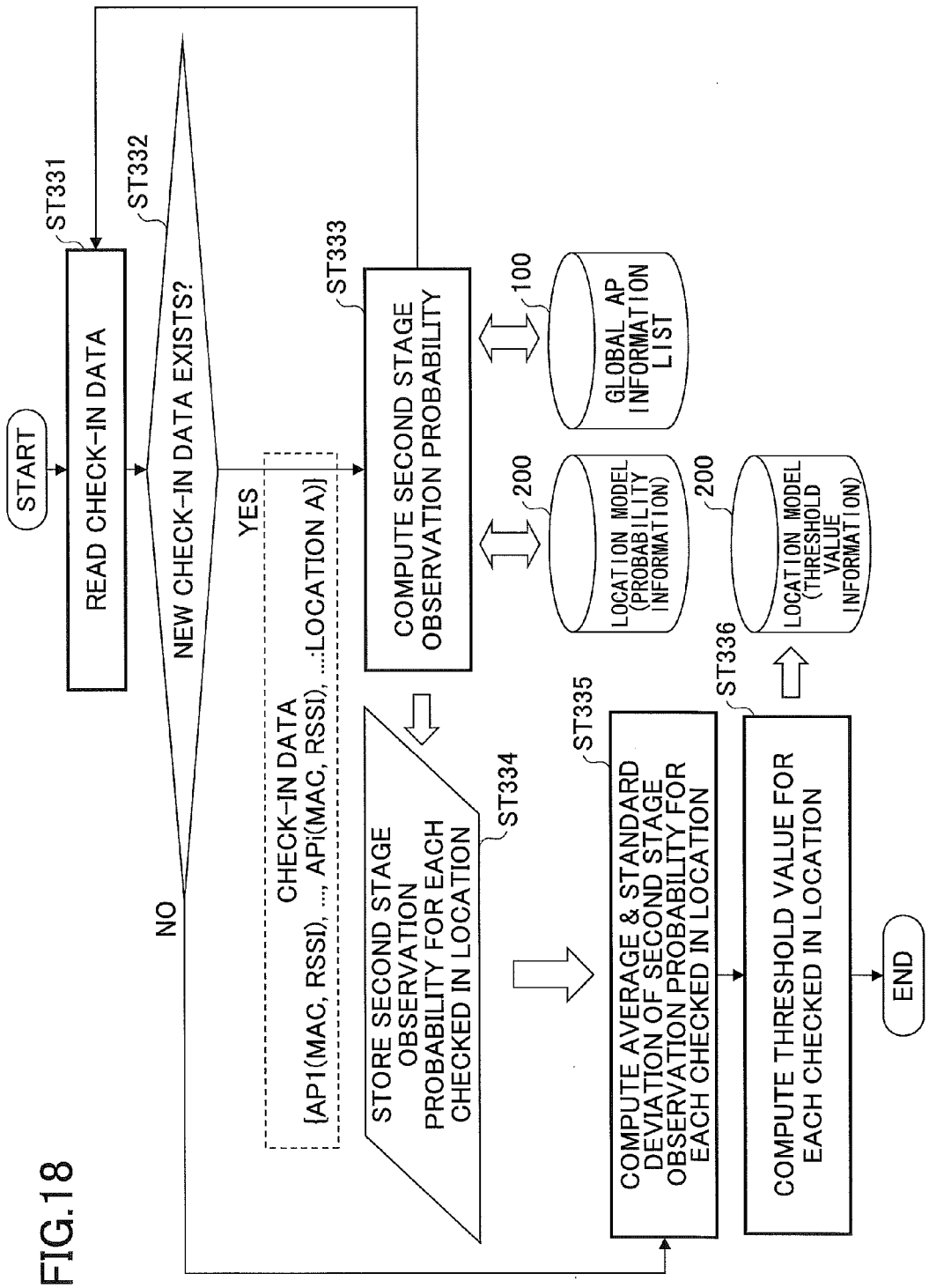

TERMINAL APPARATUS, POSITION ESTIMATING METHOD, POSITION ESTIMATING SYSTEM, AND COMPUTER-READABLE STORAGE MEDIUM

CROSS-REFERENCE TO RELATED APPLICATIONS

This application is a continuation application of International Application No. PCT/JP2013/059237 filed on Mar. 28, 2013 and designated the U.S., the entire contents of which are incorporated herein by reference.

FIELD

The embodiments discussed herein are related to a terminal apparatus, a position estimating method, a position estimating system, and a program. The embodiments discussed herein are also related to a computer-readable storage medium that stores such a program.

BACKGROUND

When a mobile terminal makes radio communications with a plurality of base stations, a signal intensity of radio waves received by the mobile terminal attenuates depending on a distance of the mobile terminal from each of the base stations, and a position estimating technique has been proposed to estimate a location of the mobile terminal using the signal intensity attenuation. The base station may be an AP (Access Point) using Wi-Fi (Wireless-Fidelity, registered trademark).

According to this proposed position estimating technique, the mobile terminal collects an ID (Identifier) of the base station and an RSSI (Received Signal Strength Indicator) received beforehand at each location. An RSSI feature vector that is uniquely determined for each location is created from numerical values of the IDs of the plurality of base stations and the RSSIs received at each location, so as to create a location model for each location. The location model is a database indicating the RSSIs of the radio waves received from each of the base stations at each of the locations. When estimating the location, the RSSIs of the radio waves the mobile terminal receives from the base stations are collated with the location model, in order to estimate the location of the mobile terminal. In general, the location model may be created according to methods such as the k-NN (k-Nearest Neighbor algorithm), the probability method based on a probability distribution, the non-parametric method, and the pattern matching method which will be described hereinafter.

The k-NN first stores pairs of RSSI feature vectors and location names collected at each location. Next, when estimating the location, a newly observed RSSI feature vector and samples within the database are collated, in order to extract K nearest neighbor samples. Finally the K nearest neighbor samples are voted to determine the location.

However, according to the k-NN, the number of samples is large, and a database having a large capacity is required to store the samples. It is difficult to store such a large-capacity database in the mobile terminal. In addition, because of the large number of samples, it takes a long time to perform the process of collating the newly observed RSSI feature vector and the samples within the database. Furthermore, in a case in which the RSSIs change due to a AP that is newly set up, the AP that is removed, the AP that is moves, changes in a layout of furniture within the location, or the like, it is difficult to perform an on-line updating of the database. Hence, with respect to such a change in the RSSIs, measures such as discarding the database that has been configured and configuring a new database, for example, are required.

The probability method based on the probability distribution include the parametric method and the non-parametric method.

The parametric method computes model parameters by fitting samples of the RSSI feature vectors collected at one location for various orientations at which the mobile terminal is held, to a statistical model. For example, an average and a covariance of a sample distribution for each location become the model parameters of this type of location model. When estimating the location of the mobile terminal, the newly observed RSSI feature vector is fitted to an RSSI distribution at each location, in order to compute an observation probability for a case in which the observation is made at the location. The location where the observation probability becomes a maximum is output as an estimated location.

However, when estimating the location according to the parametric method, the observation probability of the newly observed RSSI feature vector must be computed for all location models. For this reason, in a case in which the number of candidate locations is large, it takes a long time to perform the computing process. In addition, similarly as in the case of the k-NN, it is difficult to perform on-line updating of the location model. In addition, because the location estimation is a relative evaluation of the probability (that is, the location having the maximum probability is output), it is impossible to cope with a case in which the mobile terminal is at a location other than a learned location.

The non-parametric method utilizes an observation frequency histogram of the intensity levels of the RSSIs, instead of utilizing the average and the covariance of the parameters of the location model. In general, the value of the RSSI changes because the radio waves are reflected or blocked by surrounding walls, obstructions, or the like. For this reason, it is difficult to accurately represent the RSSI distribution by the parameters of the location model, such as the simple average and the covariance. Hence, a more accurate location model can be generated by utilizing the observation frequency histogram of the intensity levels of the RSSIs as the probability distribution. More particularly, when estimating the location of the mobile terminal, the observation probability of the newly observed RSSI feature vector is computed based on an RSSI intensity histogram, and the location where the observation probability becomes a maximum is output as the estimated location.

However, when estimating the location according to the non-parametric method, the observation probability of the newly observed RSSI feature vector must be computed for all location models. For this reason, in a case in which the number of candidate locations is large, it takes a long time to perform the computing process. In addition, it is difficult to perform the on-line updating of the location model. Further, because the location estimation is a relative evaluation of the probability (that is, the location having the maximum probability is output), it is impossible to cope with a case in which the mobile terminal is at a location other than the learned location.

The pattern matching method performs a more accurate modeling of the RSSI distribution, by utilizing a location model that is more complex compared to that utilized by the probability method described above. The pattern matching method includes the ANN (Artificial Neural Network), the SVM (Support Vector Machine), the GP (Gaussian Process), or the like, for example.

However, according to the pattern matching method, the observed RSSI feature vector must be collated with a large number of location models, thereby taking a long time to perform the computing process and increasing the computation cost. In addition, it is difficult to perform the on-line updating of the location model. Further, relearning of the location model is required in a case in which the AP is newly set up, the AP is removed, the AP is moved, the layout of the furniture within the location changes, or the like.

Related art include Japanese Laid-Open Patent Publications No. 2010-239331 and No. 2011-179946, Teemu Roos et al., "A Probabilistic Approach to WLAN User Location Estimation", International Journal of Wireless Information Networks, Vol. 9, No. 3, July 2002, and Ville Honkavirta et al., "A Comparative Survey of WLAN Location Fingerprinting Methods", Proc. of the 6th Workshop on Positioning, Navigation and Communication 2009 (WPNC '09), Pages 243-251, for example.

According to the conventional position estimating methods, it takes a long time to perform the process and a high-speed estimation of the location is difficult, in a case in which the location of the mobile terminal is to be estimated from a large number of candidate locations on the order of several ten-thousand or more, for example.

SUMMARY

Accordingly, it is an object in one aspect of the embodiments to provide a terminal apparatus, a position estimating method, a position estimating system, a program, and a computer-readable storage medium, which can estimate the location of the mobile terminal at a high speed.

According to one aspect of the embodiments, a mobile terminal communicable with a plurality of base stations, includes a storage unit configured to store a program, and a processor configured to execute the program to perform a position estimating process that includes narrowing down candidate positions of the mobile terminal estimated from signals received from the plurality of base stations, based on missing data of the signals received from a certain base station, and estimating a position of the mobile terminal from the narrowed down candidate positions, based on an observation probability of intensities of the signals received.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a data structure of a global AP information list;

FIG. 7 is a diagram illustrating an example of a data structure of a location model;

FIG. 18 is a flow chart for explaining an example of a location model (threshold information) learning process.

DESCRIPTION OF EMBODIMENTS

Figure 1:
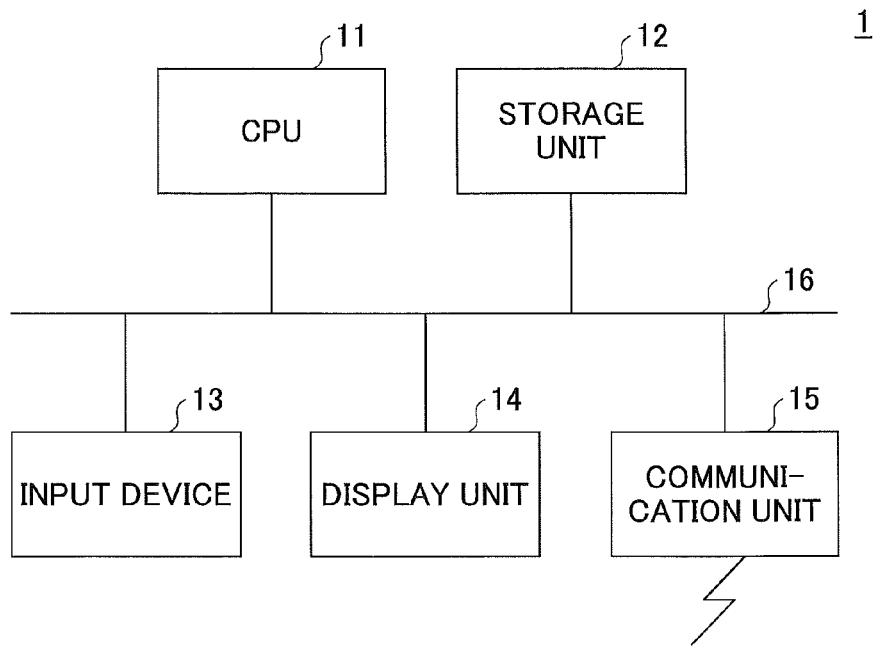
FIG. 1 is a block diagram illustrating an example of a configuration of a mobile terminal in one embodiment.

Preferred embodiments of the present invention will be described with reference to the accompanying drawings.

A description will now be given of the terminal apparatus, the position estimating method, the position estimating system, the program, and the computer-readable storage medium in each embodiment according to the present invention, by referring to the drawings.

The disclosed terminal apparatus, position estimating method, position estimating system, program, and computer-readable storage medium may narrow down candidate positions of a mobile terminal estimated based on signals received from a plurality of base stations, based on missing data of the signal received from a certain base station, and estimate the position of the mobile terminal from the narrowed down candidate positions based on an observation probability of intensities of the signals received.

FIG. 1 is a block diagram illustrating an example of a configuration of a mobile terminal in one embodiment. A mobile terminal 1 illustrated in FIG. 1 is an example of a terminal apparatus having a communicating function, and may be a mobile phone, or the like, for example. The mobile terminal 1 has a configuration in which a CPU (Central Processing Unit) 11, a storage unit 12, an input device 13, a display unit 14, and a communication unit 15 are connected via a bus 16, however, the configuration is not limited to a connection using the bus 16.

The CPU 11 is an example of a computer or a processor. The CPU 11 controls the entire mobile terminal 1, and performs a position estimating process or the like, which will be described later, by executing a program. The storage unit 12 stores programs to be executed by the CPU 11, intermediate results of computations performed by the CPU 11, data used by the programs or computations executed by the CPU 11, or the like. The storage unit 12 may be formed by a non-transitory computer-readable storage medium. The non-transitory computer-readable storage medium may be a semiconductor memory device. In addition, in a case in which the non-transitory computer-readable storage medium is a magnetic recording medium, an optical recording medium, a magneto-optical recording medium, or the like, the storage unit 12 may be formed by a reader and writer that reads information from and writes information to the recording medium that is loaded thereto.

The input device 13 may be formed by a keyboard, or the like, and is operated when inputting commands, data, or the like to the mobile terminal 1, for example. The display unit 14 may be formed by an LCD (Liquid Crystal Display), for example, and displays guidances, messages, or the like. The input device 13 and the display unit 14 may be integrally provided, and may be formed by a touchscreen panel, for example. The communication unit 15 includes a radio communication function capable of making radio communication with an external apparatus (not illustrated), and has a known configuration including a receiver, a transmitter, an antenna, or the like. In this example, the communication unit 15 is communicable with an AP (Access Point) that uses Wi-Fi, for example. The AP is an example of a base station.

Figure 2:
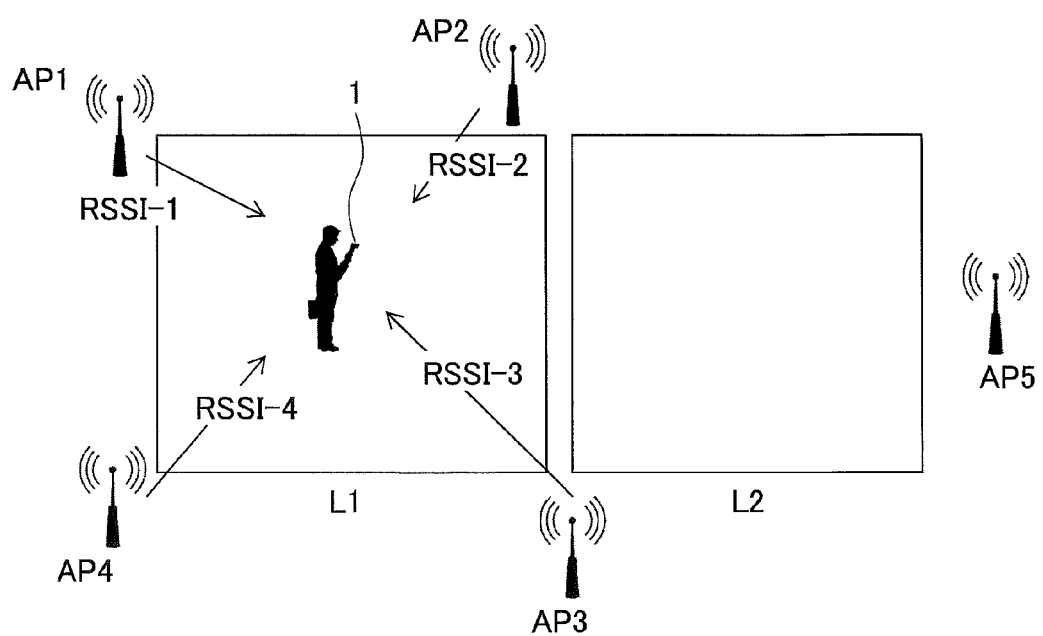
FIG. 2 is a diagram for explaining an example of a relationship of a plurality of APs and locations where the mobile terminal may exist.

FIG. 2 is a diagram for explaining an example of a relationship of a plurality of APs and locations where the mobile terminal may exist. In the example illustrated in FIG. 2, a plurality of AP1 through AP5 cover locations L1 and L2, and the mobile terminal 1 carried by a user exists within the location L1. An RSSI (Received Signal Strength Indicator) at the mobile terminal 1 is RSSI-1 from the AP1, RSSI-2 from the AP2, RSSI-3 from the AP3, RSSI-4 from the AP4, and RSSI-5 from the AP5.

Figure 3:
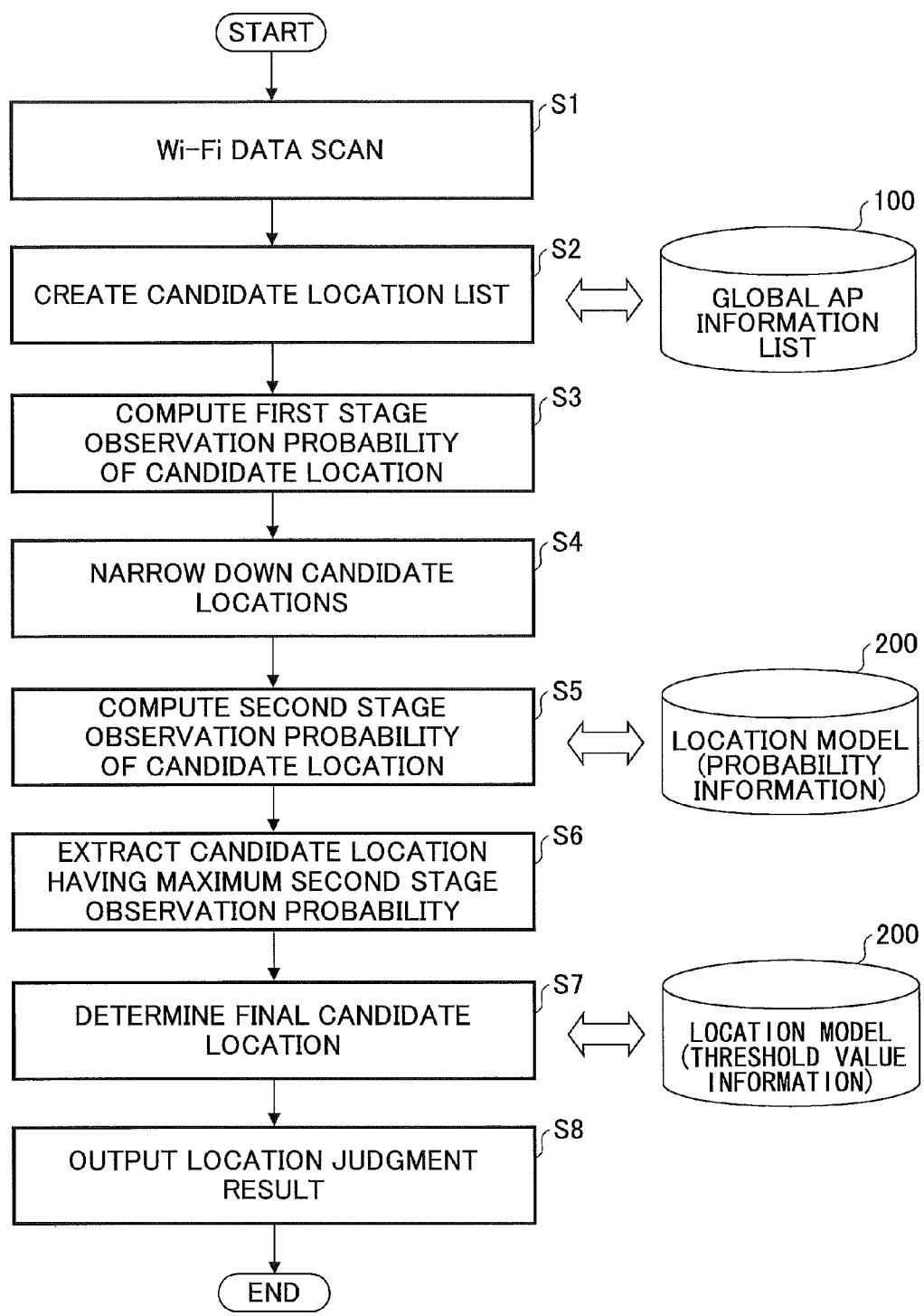
FIG. 3 is a flow chart for explaining an example of a position estimating process of the mobile terminal.

FIG. 3 is a flow chart for explaining an example of a position estimating process of the mobile terminal. The position estimating process illustrated in FIG. 3 may be performed by the CPU 11. In step S1 illustrated in FIG. 3, Wi-Fi data (hereinafter also referred to as "Wi-Fi scan data") from each of the APs is scanned via the communication unit 15, and a MAC (Media Access Control) address of each AP and the RSSI are acquired, to create an RSSI feature vector. In addition, in step S1, a reference is made to a global AP information list 100 stored in the storage unit 12, in order to exclude an unlearned AP not included in the global AP list 100. FIG. 4 is a diagram illustrating an example of a data structure of the global AP information list. The global AP information list 100 illustrated in FIG. 4 includes, with respect to AP numbers 1, 2, . . . allocated for each of the APs for the sake of convenience, MAC addresses M1, M2, . . . of each of the APs and a coverage location list of each of the APs. The coverage location list of the AP stores the location names L1, L2, L3, . . . or the like.

As will be explained below, for example, the global AP information list 100 can be created based on information acquired from the Wi-Fi scan data. First, a blank global AP information list 100 is prepared. Thereafter, the global AP information list 100 is retrieved, and if a source AP (or check-in AP) of the Wi-Fi scan data is new, the MAC address of the check-in AP is added to the global AP information list 100. At the same time, the location name where the check-in is made is added to the coverage location list of the check-in AP. In a case in which the check-in AP is already stored in the global AP information list 100, the coverage location list of this check-in AP is retrieved, and the check-in location name is added to the coverage location list if the check-in location name is new.

In step S2, a reference is made to the global AP information list 100 illustrated in FIG. 4, and all coverage locations of the retrieved APs are regarded as candidate locations, so as to create a candidate location list and store the candidate location list in the storage unit 12.

Figure 5:
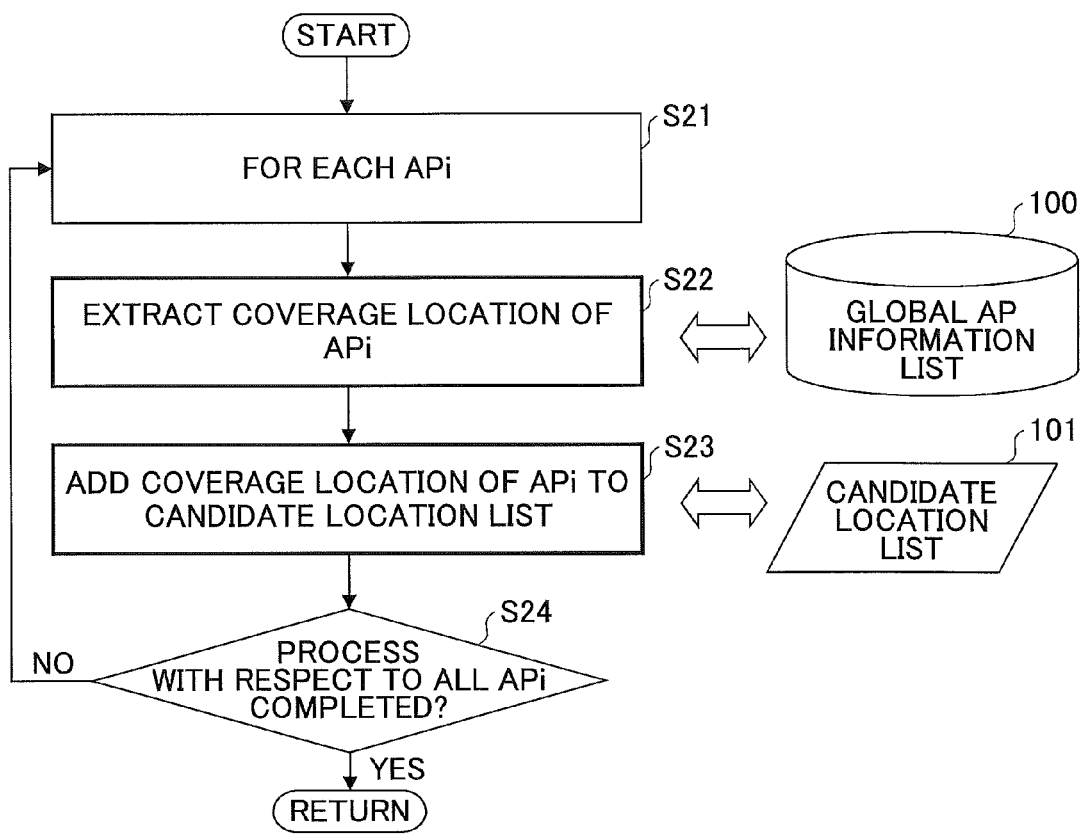
FIG. 5 is a flow chart for explaining an example of a candidate location list creating process.

FIG. 5 is a flow chart for explaining an example of a candidate location list creating process of step S2. In step S21 illustrated in FIG. 5, processes of step S22 and subsequent steps are performed with respect to each APi. In step S22, a reference is made to the global AP information list 100 illustrated in FIG. 4, and the coverage location list of the APi is extracted. In step S23, a process is performed to add all location members of the coverage location list of the APi to a candidate location list 101. However, step S23 is skipped when the location members are already added to the candidate location list 101. In step S24, a judgment is performed to determine whether the process with respect to all APi is completed. The process returns to step S21 when the judgment result in step S24 is NO, and the process advances to step S3 illustrated in FIG. 3 when the judgment result in step S24 is YES.

Figure 6:
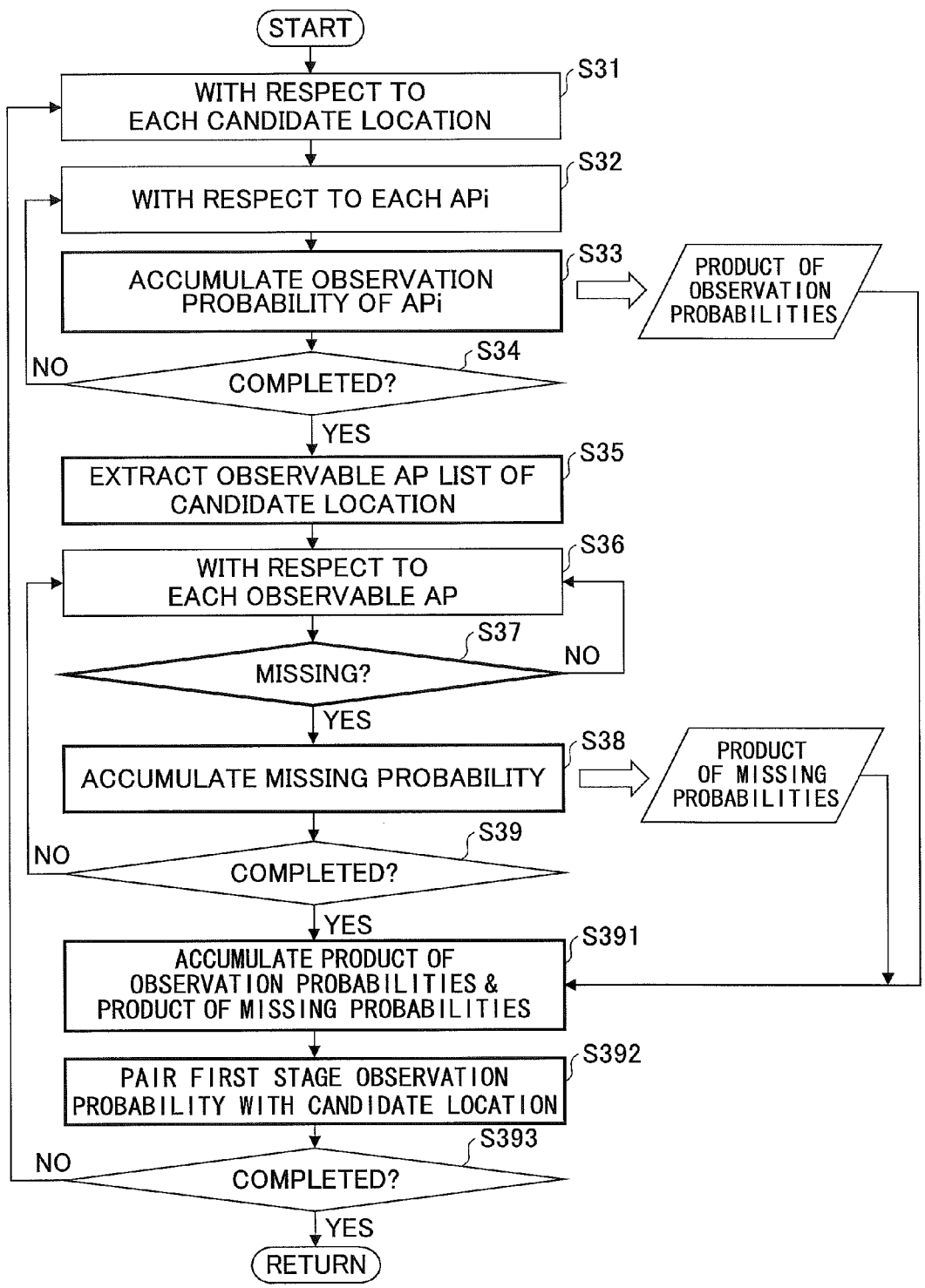
FIG. 6 is a flow chart for explaining an example of a first stage observation probability computing process.

In step S3 illustrated in FIG. 3, a first stage observation probability of the source AP of the Wi-Fi scan data is computed with respect to each member of the candidate location list 101. FIG. 6 is a flow chart for explaining an example of a first stage observation probability computing process of step S3. FIG. 7 is a diagram illustrating an example of a data structure of a location model. A location model 200 illustrated in FIG. 7 stores a location number, a location name, a threshold value of a second stage observation probability used within the location, and an observable AP list. The observable AP list includes, with respect to the MAC address, a missing probability, an observation probability, an observation probability for different intensity levels of RSSIs when the AP is observed, or the like. FIG. 7 illustrates a case in which the number of intensity levels of the RSSIs when the AP is observed is 4, for example, and a length of the observable AP list is 3, for example. A location model 200 is stored in the storage unit 12, for example. Because the observable AP list includes a probability information part of the location model 200, FIG. 3 illustrates the location model 200 as a "location model (probability information)". On the other hand, parts other than the observable AP list include a threshold value information part of the second stage observation probability used at each location of the location model 200, FIG. 3 illustrates the location model 200 as a "location model (threshold value)".

In step S31 illustrated in FIG. 6, processes of step S32 and subsequent steps are performed with respect to each candidate location. In step S32, processes of step S33 and subsequent steps are performed with respect to each APi. In step S34, the observable AP list of the candidate location of the location model 200 illustrated in FIG. 7 is retrieved, and if APi exists in this observable AP list, an observation probability that is learned in advance is acquired. On the other hand, if APi does not exist in the observable AP list, a relatively small constant, for example, that is set in advance, is regarded as the observation probability. In step S34, the observation probability of APi is accumulated to a product of the observation probabilities stored in the storage unit 12. In step S34, a judgment is made to determine whether the process with respect to all APi is completed. The process returns to step S32 when the judgment result in step S34 is NO, and the process advances to step S35 when the judgment result in step S34 is YES.

In step S35, the observable AP list of the candidate location of the location model 200 illustrated in FIG. 7 is extracted. In step S36, processes of step S37 and subsequent steps are performed with respect to each observable AP. In step S37, Wi-Fi scan data (AP1(MAC, RSSI), . . . ) are retrieved, and a judgment is made to determine whether an observable AP is missing. When the MAC address of the observable AP does not exist within the Wi-Fi scan data, it is judged that the observable AP is missing and the judgment result in step S37 becomes NO, and the process returns to step S36. On the other hand, when the judgment result in step S37 is YES, in step S38, a missing probability of the observable AP is extracted from the location model 200, and the missing probability is accumulated to a product of the missing probabilities stored in the storage unit 12. In step S39, a judgment is made to determine whether the process with respect to all observable APs is completed, and the process returns to step S36 when the judgment result in step S39 is NO.

When the judgment result in step S39 is YES, in step S391, a product value of the product of the observation probabilities and the product of the missing probabilities stored in the storage unit 12 is computed. In step S392, the product value computed in step S391 is regarded as a first stage observation probability of the candidate location, and is paired with the candidate location and stored in the storage unit 12. In step S393, a judgment is made to determine whether the process with respect to all candidate locations is completed. The process returns to step S31 when the judgment result in step S393 is NO, and the process advances to step S4 illustrated in FIG. 3 when the judgment result in step S393 is YES.

Figure 8:
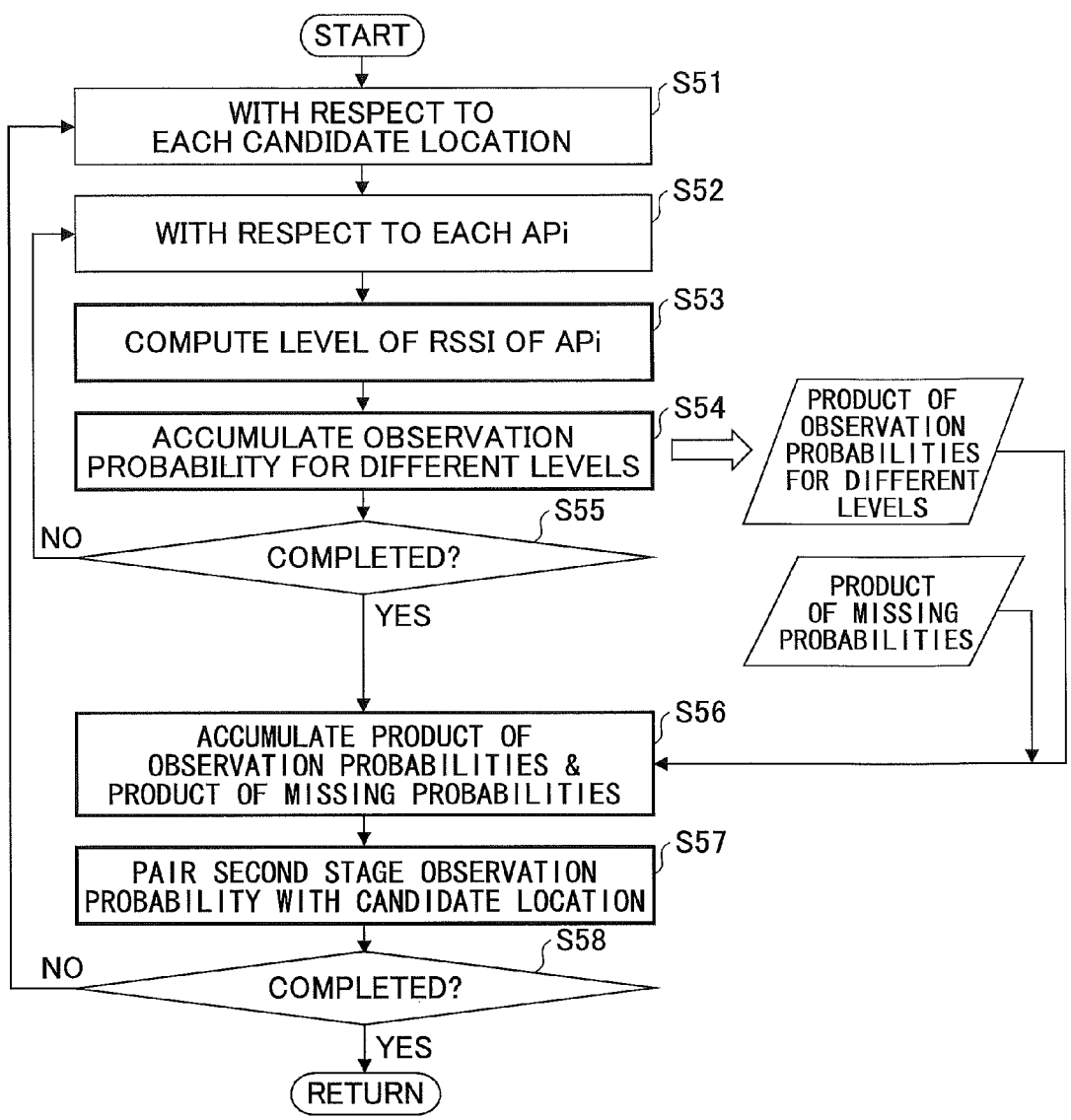
FIG. 8 is a flow chart for explaining an example of a second stage observation probability computing process.

In step S4 illustrated FIG. 3, the candidate locations having low first stage observation probabilities are discarded, in order to narrow down the candidate locations. In step S5, a second stage observation probability is computed based on the RSSI feature vector, with respect to the narrowed down candidate locations. FIG. 8 is a flow chart for explaining an example of a second stage observation probability computing process of step S5.

The second stage observation probability computing process illustrated in FIG. 8 is performed with respect to the candidate location lists that are narrowed down in step S4 according to the first stage observation probability computed in step S3. In step S51, process of step S52 and subsequent steps are performed with respect to each candidate location. In step S52, processes of step S53 and subsequent steps are performed with respect to each APi. In step S53, a reference is made to the location model 200, and if the MAC address of APi exists in the observable AP list of the candidate location, an intensity level is computed from the RSSI of APi, and an observation probability for different intensity levels of the RSSIs when APi is observed is acquired from the location model 200. On the other hand, if the MAC address of APi does not exist in the observable AP list of the candidate location, a relatively small fixed value, for example, that is set in advance, is regarded as the observation probability for the different intensity levels of the RSSIs when APi is observed.

In step S54, the observation probability for the different intensity levels of the RSSIs when APi is observed is accumulated to a product of the observation probability for the different intensity levels stored in the storage unit 12. In step S55, a judgment is made to determine whether the process with respect to all APi is completed. The process returns to step S52 when the judgment result in step S55 is NO, and the process advances to step S56 when the judgment result in step S55 is YES. In step S56, a product value of the product of the missing probabilities computed in step S3 and a product of the observation probabilities for the different intensity levels stored in the storage unit 12 is computed, and the computed product value is stored in the storage unit 12. In step S57, the product value computed in step S56 is regarded as a second stage observation probability of the candidate location, and is paired with the candidate location and stored in the storage unit 12. In step S58, a judgment is made to determine whether the process with respect to all candidate locations is completed. The process returns to step S51 when the judgment result in step S58 is NO, and the process advances to step S6 illustrated in FIG. 3 when the judgment result in step S58 is YES.

In step S6 illustrated in FIG. 6, the candidate location having a maximum second stage observation probability is extracted (or selected). In step S7, a reference is made to the location model 200 illustrated in FIG. 7, and uses a threshold value of the candidate location having the maximum second stage observation probability, to judge that the mobile terminal 1 is not at a final candidate location and the location of the mobile terminal 1 is unknown in a case in which the second stage observation probability is less than the threshold value, and to judge that the mobile terminal 1 is at the final candidate location in a case in which the second stage observation probability is greater than or equal to the threshold value.

In step S8, a judgment result indicating the location of the mobile terminal 1, or indicating that the location of the mobile terminal 1 is unknown, is output, and the position estimating process ends. The judgment result output in step S8 may be output to an application or the like that provides services utilizing the position of the mobile terminal 1, for example.

The CPU 11 may perform the processes (or procedures) of steps S1 through S5 to function as a narrowing-down unit (or means) that narrows down the candidate positions of the mobile terminal estimated from the signals received from the plurality of base station, based on the missing data of the signal received from a certain base station. In addition, the CPU 11 may perform the processes (or procedures) of steps S6 and S7 to function as an estimating unit (or means) that estimates the position of the mobile terminal from the narrowed down candidate positions based on the observation probability of intensities of the signals received.

In this embodiment, in order to estimate the location of the mobile terminal 1 at a high speed, the candidate location list 101 is gradually narrowed down to finally narrow down the candidate locations to a single candidate location. With respect to this final candidate location, a judgment is made to determine whether the mobile terminal 1 is positively located at this final candidate location.

Figure 9:
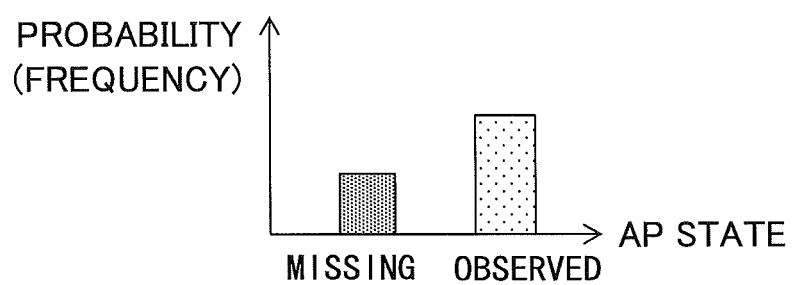
FIG. 9 is a diagram illustrating an example of a relationship of probabilities of AP states and the AP states.
Figure 10:
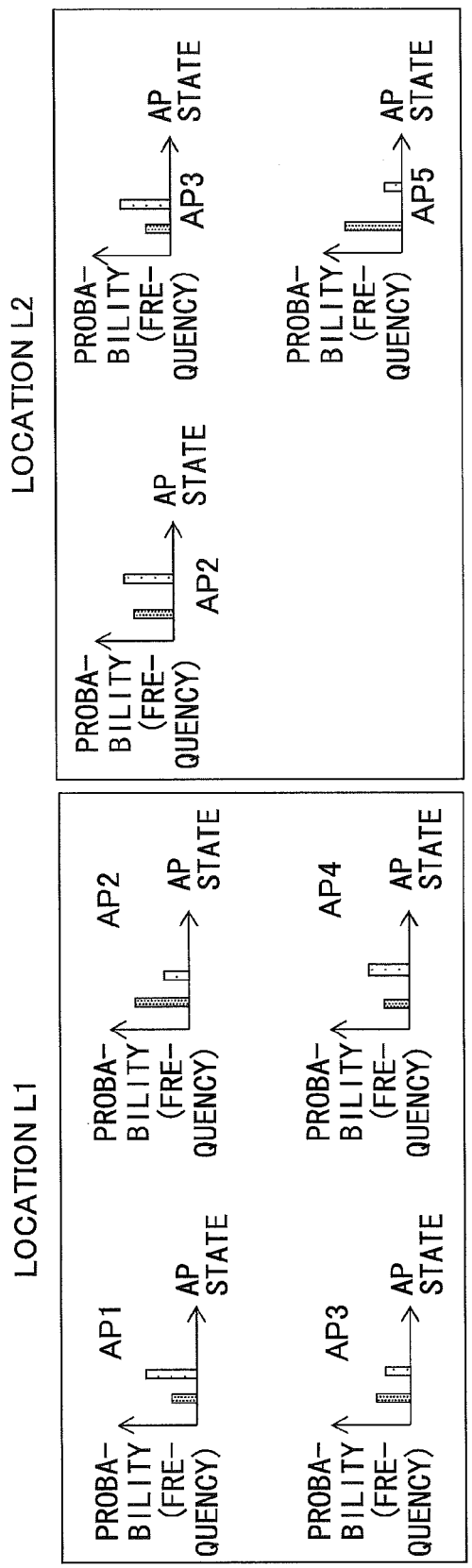
FIG. 10 is a diagram illustrating an example of the AP states at a plurality of locations.

As described above, in a first stage, the observation probability of the RSSI feature vectors are computed based on relatively coarse information. First, the candidate location list 101 is created from the global AP information list 100 that is observed, and the AP observation probability and the missing probability within the location model 200 are utilized to compute the first stage observation probability. In other words, in the first stage, the location probability can be computed using only information related to 2 AP states that are missing and observation, and a first narrowing-down is performed on the candidate location list 101 based on the computed location probability, in order to estimate the locations where the mobile terminal 1 is likely to exist. In FIG. 9, an ordinate indicates the probability (or frequency) of the AP state in arbitrary units, and an abscissa indicates the AP state (missing or observed). Because the probability (or frequency) that the AP state is the missing differs for each location, the location probability is computed using a missing generation probability that is obtained in advance. FIG. 10 is a diagram illustrating an example of the AP states at the plurality of locations. In FIG. 10, it is assumed for the sake of convenience that AP1 through AP5 are arranged at the same positions as in FIG. 2. FIG. 9 is a diagram illustrating an example of a relationship of the probabilities of AP states and the AP states at the locations L1 and L2 illustrated in FIG. 10.

In the first stage, a stage probability (first stage observation probability) p for a case in which the Wi-Fi scan data from AP1, AP3, and AP5 are observed, for example, becomes as follows.

$$p(\text{location } L1 \mid \text{scan data}) = p(AP1 = \text{observed} \mid \text{location } L1)$$
$$p(AP2 = \text{missing} \mid \text{location } L1) p(AP3 = \text{observed} \mid \text{location } L1)$$
$$p(AP4 = \text{missing} \mid \text{location } L1) p(AP5 = \text{observed} \mid \text{location } L1)$$
$$p(\text{location } L2 \mid \text{scan data}) = p(AP1 = \text{observed} \mid \text{location } L2)$$
$$p(AP2 = \text{missing} \mid \text{location } L2) p(AP3 = \text{observed} \mid \text{location } L2)$$
$$p(AP4 = \text{missing} \mid \text{location } L2) p(AP5 = \text{observed} \mid \text{location } L2)$$

Figure 11:
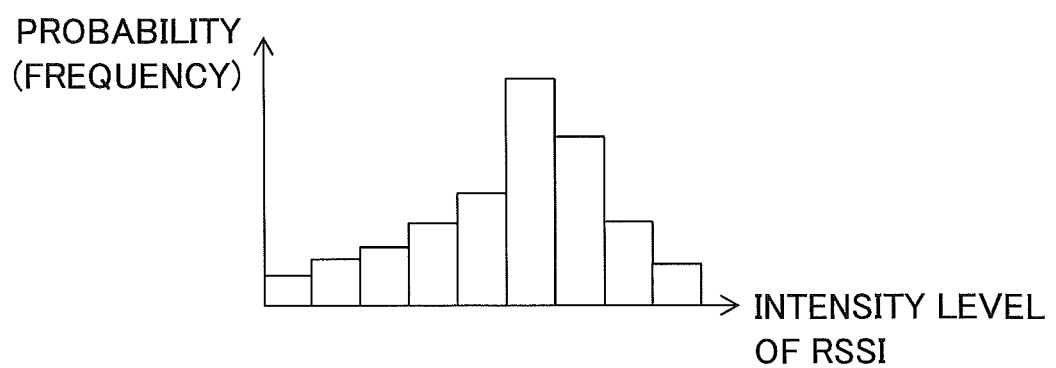
FIG. 11 is a diagram illustrating an example of a relationship of an AP missing probability and an intensity level of RSSI at candidate locations.
Figure 12:
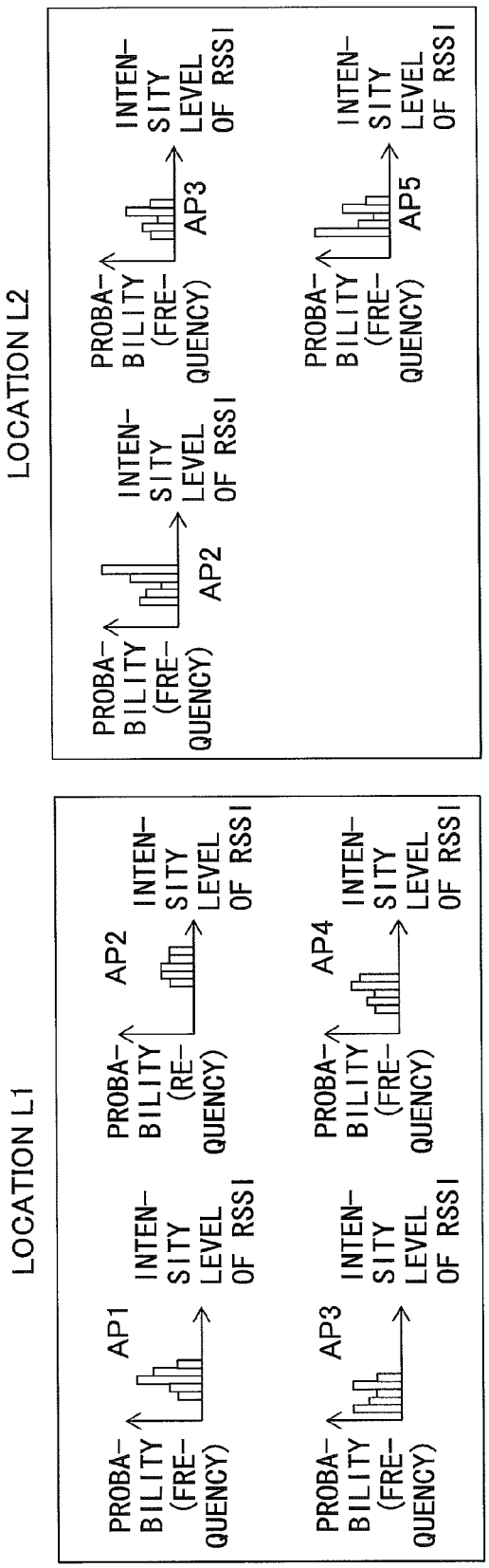
FIG. 12 is a diagram illustrating an example of the intensity level of the RSSI at a plurality of locations.

In a second stage, the second stage observation probability is computed based on the observation probability of the intensity level of the RSSI and the AP missing probability, with respect to the candidate locations having first stage observation probabilities higher than a predetermined value. In other words, in the second stage, the location probability is computed based on the observation probability of the intensity level of the RSSI of the candidate locations illustrated in FIG. 11, for example, and the AP missing probability, with respect to the narrowed down locations where the mobile terminal 1 is likely to exist. In addition, a second narrowing-down is performed on the candidate location list 101 based on the computed location probability, in order to narrow down the locations to the location candidates having the location probability that is greater than or equal to a certain value and relatively large. In FIG. 11, an ordinate indicates the AP missing probability in arbitrary units, and an abscissa indicates the intensity level of the RSSI of the candidate locations in arbitrary units. FIG. 12 is a diagram illustrating an example of the intensity level of the RSSI at the plurality of locations. In FIG. 12, it is assumed for the sake of convenience that AP1 through AP5 are arranged at the same positions as in FIG. 2. FIG. 11 is a diagram illustrating an example of a relationship of the AP missing probability and the intensity level of the RSSI at the locations L1 and L2 illustrated in FIG. 12.

In the second stage, a stage probability (second stage observation probability) p for a case in which the Wi-Fi scan data from AP1, AP3, and AP5 are observed, for example, becomes as follows, where the intensity levels of the RSSIs from AP1, AP3, and AP5 are denoted by E, C, and F, respectively.

$$p(\text{location } L1 \mid \text{scan data}) = p(\text{RSSI\_AP1} = E \mid \text{location } L1)$$
$$p(AP2 = \text{missing} \mid \text{location } L1) p(\text{RSSI\_AP3} = C \mid \text{location } L1)$$
$$p(AP4 = \text{missing} \mid \text{location } L1) p(\text{RSSI\_AP5} = F \mid \text{location } L1)$$
$$p(\text{location } L2 \mid \text{scan data}) = p(\text{RSSI\_AP1} = E \mid \text{location } L2)$$
$$p(AP2 = \text{missing} \mid \text{location } L2) p(\text{RSSI\_AP3} = C \mid \text{location } L2)$$
$$p(AP4 = \text{missing} \mid \text{location } L2) p(\text{RSSI\_AP5} = F \mid \text{location } L2)$$

Figure 13:
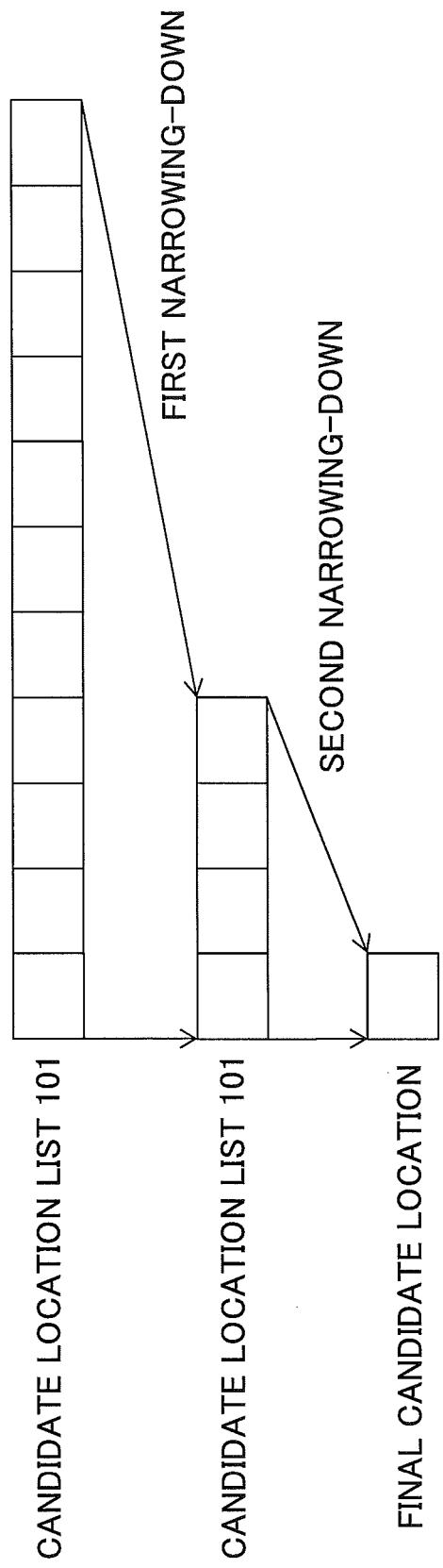
FIG. 13 is a diagram for explaining a stepwise narrowing-down of the candidate location list.

In a third stage, a judgment is made with respect to the candidate location having the maximum second stage observation probability, to finally determine whether the mobile terminal 1 is located at the candidate location having the maximum second stage observation probability. In other words, the second stage observation probability of the final candidate location that is narrowed down by the second narrowing-down is compared with a learned threshold value. It is judged that the mobile terminal 1 is located at the final candidate location when the second stage observation probability is greater than or equal to the threshold value, and it is judged that the location of the mobile terminal 1 is unknown when the second stage observation probability is less than the threshold value. As will be described later, the learned threshold value is computed from an average and a standard deviation of the location probabilities computed based on the AP missing probability and the probability distribution of the intensity levels of the RSSIs. Hence, as illustrated in FIG. 13, the candidate location list 101 is subjected to the first narrowing-down and the second narrowing-down, and is finally narrowed down to the candidate location having the maximum second stage observation probability.

Figure 14:
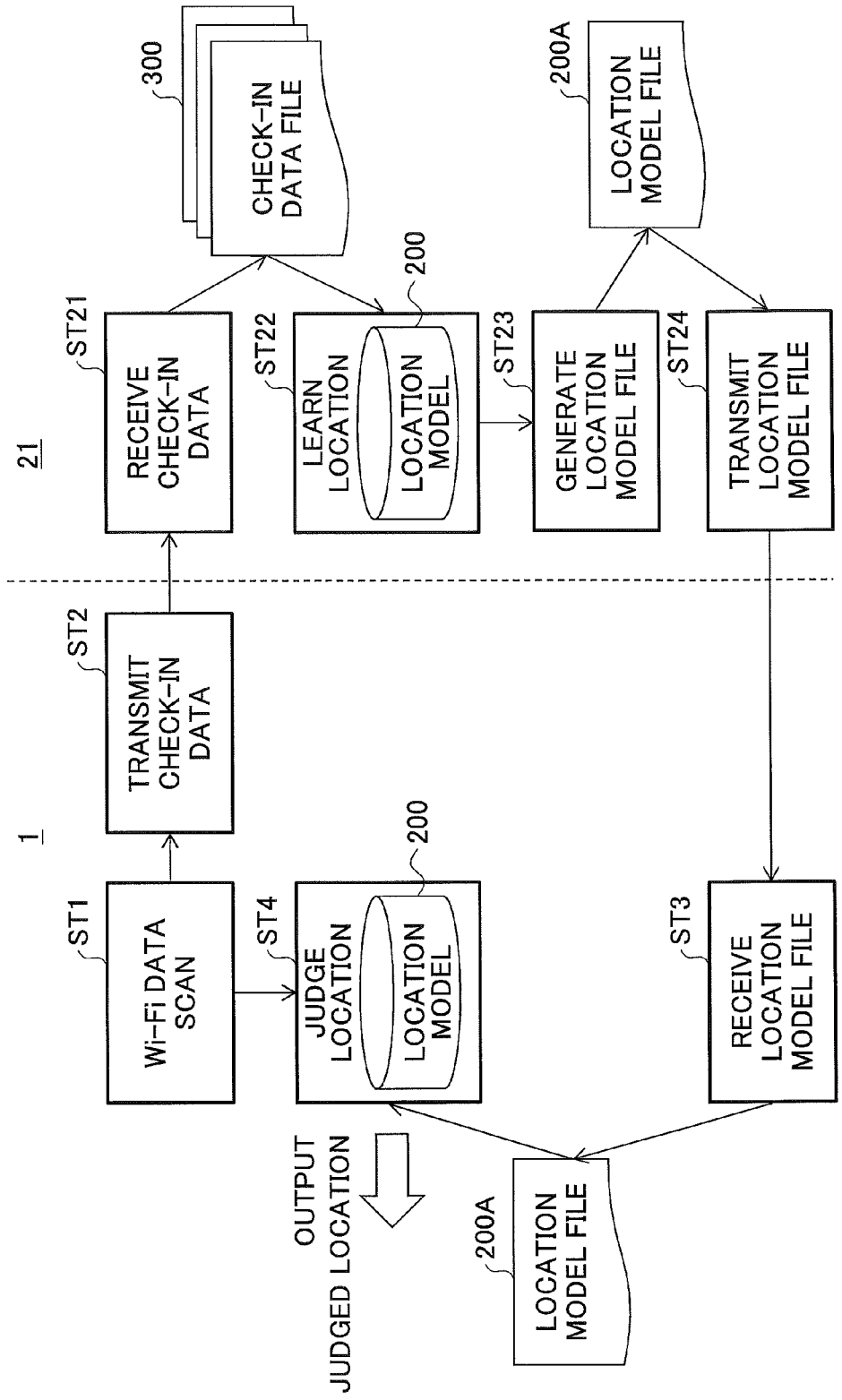
FIG. 14 is a diagram for explaining an example of an operation of a position estimating system in one embodiment.

Next, a description will be given of an example of a position estimating system in one embodiment, by referring to FIG. 14. FIG. 14 is a diagram for explaining an example of an operation of the position estimating system in one embodiment. A position estimating system 20 illustrated in FIG. 14 includes a mobile terminal 1, and a server 21 that is wirelessly communicable with the mobile terminal 1. The server 21 can learn a location model 200 using data (hereinafter also referred to as "check-in data") checked in from the mobile terminal 1. The mobile terminal 1 performs a position estimating process based on a newly observed RSSI feature vector, according to the location model 200 downloaded from the server 21. The server 21 may have a known configuration including a processor and a storage unit, similar to the configuration of the mobile terminal 1 illustrated in FIG. 1, for example, and thus, illustration and description of the configuration of the server 21 will be omitted.

In step ST1 illustrated in FIG. 14, the mobile terminal 1 acquires the check-in data by acquiring the MAC address and the RSSI of each AP from the Wi-Fi scan data. In step ST2, the mobile terminal 1 transmits the check-in data to the server 21.

In step ST21, the server 21 receives the check-in data from the mobile terminal 1 and stores the check-in data in a check-in data file 300 within a storage unit of the server 21. When a predetermined time elapses from a time when the check-in data is stored in the check-in data file 300, in step ST22, the server 21 reads the check-in data file 300 from the storage unit of the server 21, and performs a learning process to learn the location model 200.

The learning process to learn the location model 200 includes 2 learning stages, namely, a learning of a probability information part of the location model 200, and a learning of a threshold value information part of the location model 200. The learning of the probability information part uses the check-in data to learn the location model (probability information) that is the probability information part of the location model 200. Thereafter, in the calculation of the second stage observation probability, the second stage of the location estimating process is performed with respect to the check-in data based on the location model (probability information). The second stage observation probability and the location name of the check-in location obtained by the second stage of the location estimating process are used to compute the threshold value of the second stage observation probability, that is, the threshold value of each check-in location, to learn the location model (threshold value information) that is the threshold value information part of the location model 200. Hence, the learning of the location model 200 is completed after learning the probability information part and the threshold value information part of the location models.

In step ST23, the server 21 generates a file (hereinafter also referred to as a "location model file") 200A of the learned location model 200, and stores the location model file 200A in the storage unit of the server 21. In step ST24, the server 21 reads the location model file 200A from the storage unit of the server 21, and transmits the location model file 200A to the mobile terminal 1.

In step ST3, the mobile terminal 1 receives the location model file 200A from the server 21, and stores the location model file 200A in the storage unit 12 of the mobile terminal 1. In other words, the mobile terminal 1 stores the location model file 200A in the storage unit 12 every time a new location model file 200A is generated in the server 21. In step ST4, the mobile terminal 1 reads the location model file 200A from the storage unit 12, uses the location model 200 to perform the position estimating process based on the RSSI feature vector of the check-in data, and outputs a judgment result on the location of the mobile terminal 1.

Figure 15:
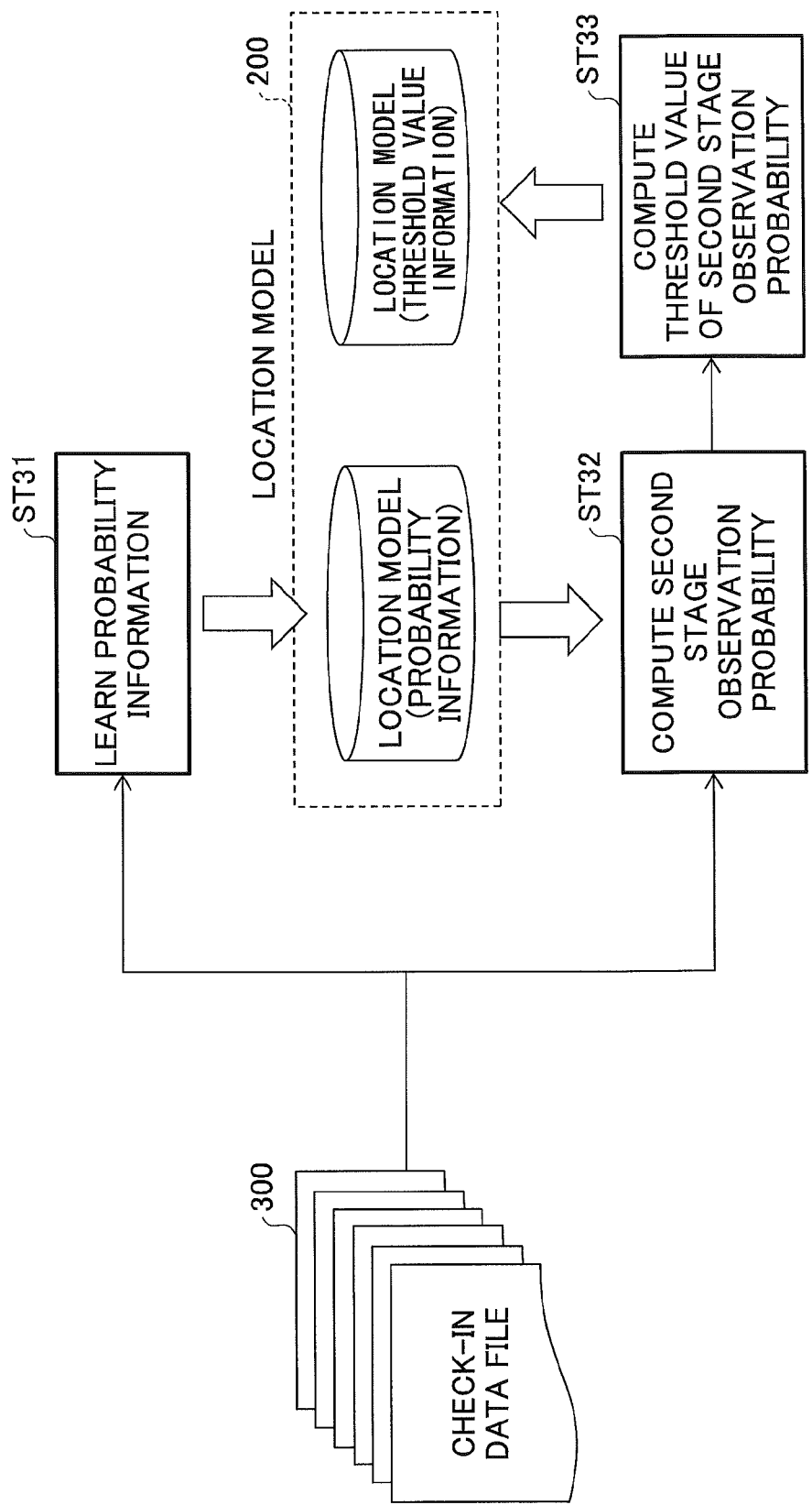
FIG. 15 is a diagram for explaining an example of a location model learning process performed by a server.

Next, a description will be given of the learning process to learn the location model 200, by referring to FIG. 15. As described above, the learning process to learn the location model 200 includes the learning of the location model (probability information) and the location model (threshold value information). FIG. 15 is a diagram for explaining an example of the location model learning process performed by the server.

In step ST31 illustrated in FIG. 15, the server 21 performs the learning process to learn the location model (probability information), to learn the probability information such as the AP missing probability, the AP observation probability, the observation probability for the different intensity levels of the RSSIs when the AP is observed, or the like, with respect to each observable AP at each location. The learned probability information is stored in the location model 200 within the storage unit of the server 21. The AP missing probability is a numerical value that is obtained by dividing a missing number of a target AP in all of the check-in data by a total number of check-in data. The missing number is a numerical value that is obtained by subtracting an observation number from the total number of check-in data. The AP observation probability is a numerical value that is obtained by dividing the observation number of the target AP of all of the check-in data by the total number of check-in data. In addition, the observation probability for the different intensity levels of the RSSIs when the AP is observed is a numerical value that is obtained by discretizing the RSSIs to the plurality of intensity levels at predetermined intervals, and thereafter dividing the observation number of each intensity level of the target AP by the total number of check-in data.

The learning of the location model (threshold value information) includes steps ST32 and ST33. In step ST32, the server 21 computes the threshold value of the second stage observation probability for each location. More particularly, the second stage observation probability is computed based on the location model (probability information) that is learned as described above, with respect to all of the check-in data. In step ST333, the server 21 computes the average and the standard deviation of the second stage observation probability, and computes the threshold value based on the average and the standard deviation of the computed second stage observation probability, according to the AP missing probability and the probability distribution of the intensity levels of the RSSIs. The learned threshold value information is stored in the location model 200 within the storage unit of the server 21.

Figure 16:
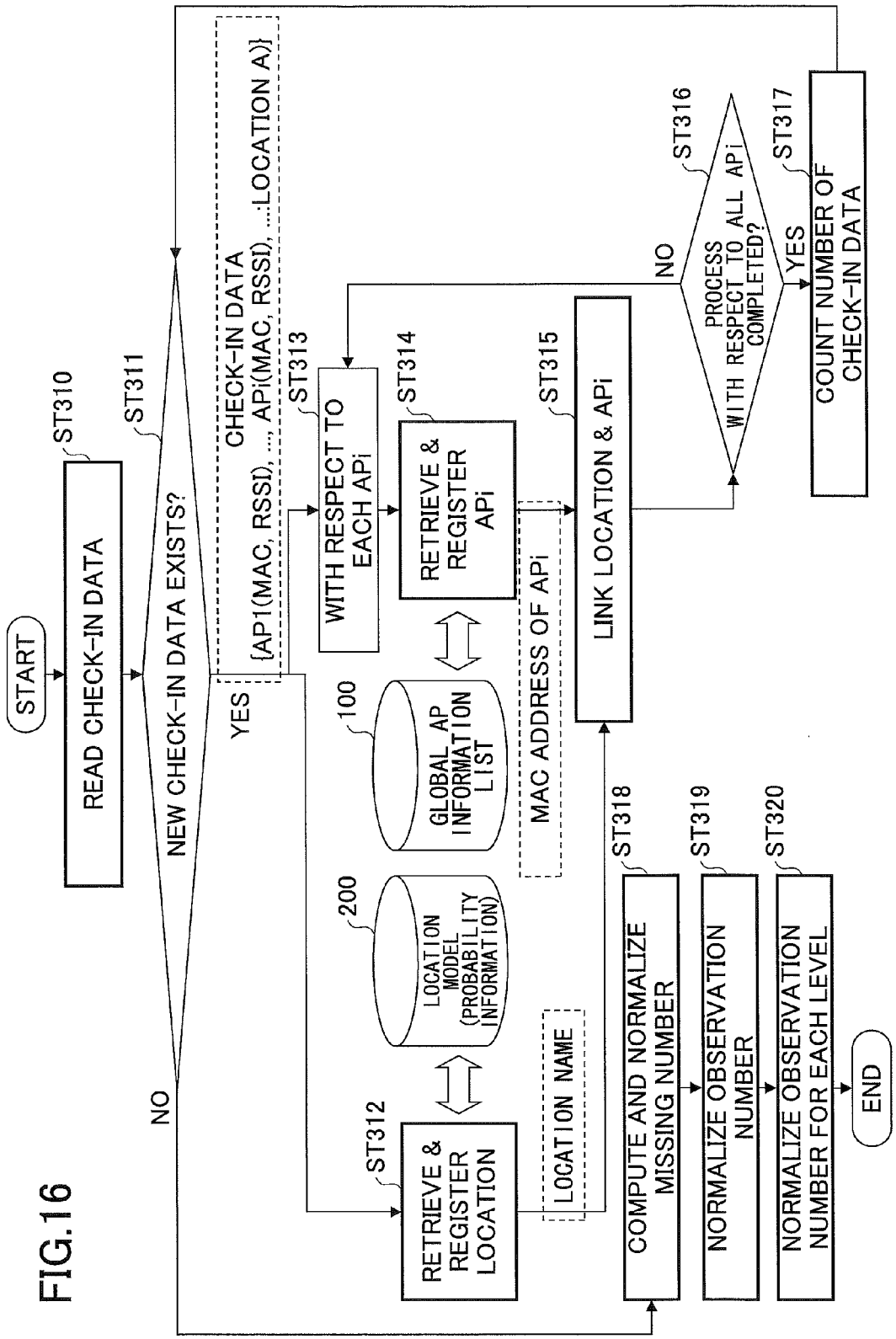
FIG. 16 is a flow chart for explaining an example of a location model (probability information) learning process.

FIG. 16 is a flow chart for explaining an example of the location model (probability information) learning process of the server. In step ST310 illustrated in FIG. 16, the check-in data is read from the check-in data file 30 within the storage unit of the server 21. In step ST311, a judgment is made to determine whether new check-in data exist, and when the judgment result in step ST311 is YES, the process advances in parallel to steps ST312 and ST313. When the judgment result in step ST311 is NO, the process advances to step ST318 which will be described later. When the new check-in data exist and the judgment result in step ST311 is YES, the check-in data (AP1(MAC, RSSI), . . . , APi(MAC, RSSI), . . . : location A) within a frame indicated by dotted lines are supplied to steps ST312 and ST313. In step ST312, a new check-in location name (location A) is registered in the location model 200 illustrated in FIG. 7. When the check-in location (location A) is a new location, a new location number is allocated to this new location, and a new row is added to the location model 200 illustrated in FIG. 7.

On the other hand, in step ST313, processes of step ST314 and subsequent steps are performed with respect to each APi. In step ST314, the check-in AP is registered to the global AP information list 100 illustrated in FIG. 4. When the new AP (for example APi) exists, a new AP number is allocated to this new AP, and a new row is added to the global AP information list 100 illustrated in FIG. 4.

Figure 17:
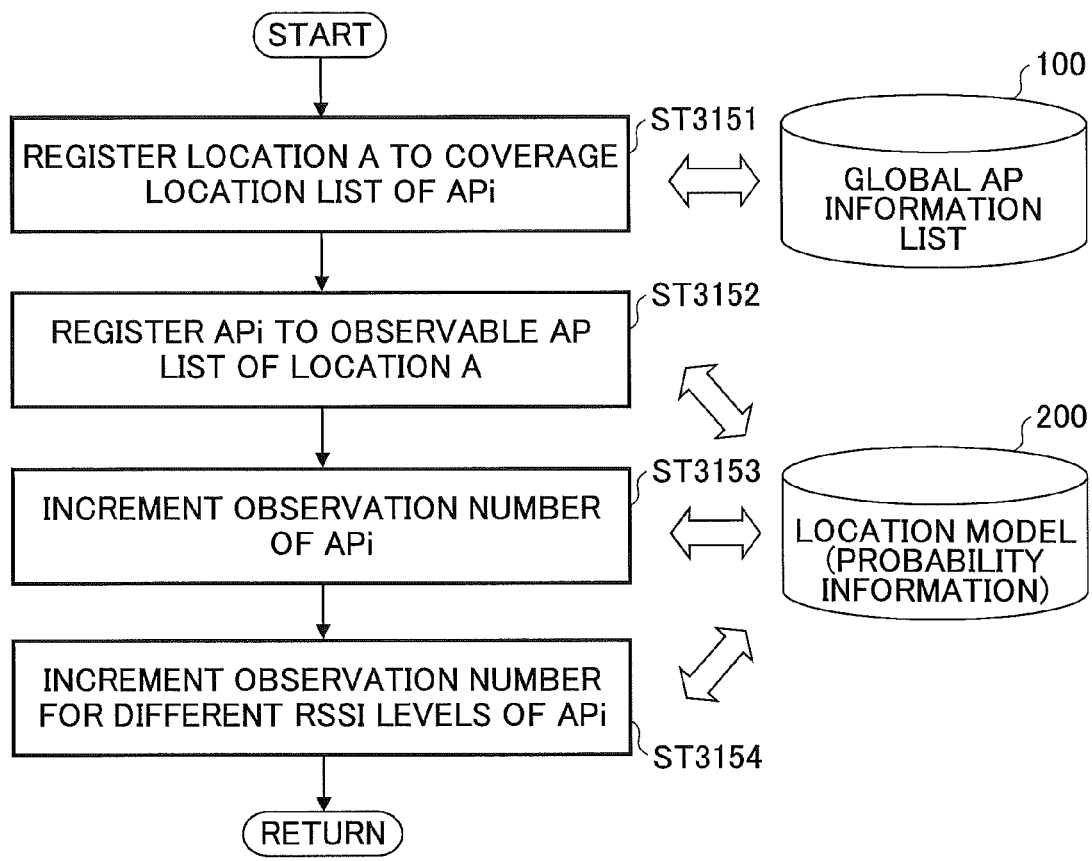
FIG. 17 is a flow chart for explaining an example of a location and an $AP_i$ linking process.

In step ST315, a process is performed to link information of the check-in location name and the check-in AP. FIG. 17 is a flow chart for explaining an example of a location and an $AP_i$ linking process of step ST315. In step ST3151 illustrated in FIG. 17, the check-in location A is registered to an AP covering location list of the global AP information list 100 illustrated in FIG. 4. In step ST3152, the check-in AP is registered to the observable AP list of the location model 200 illustrated in FIG. 7. In step ST3153, an observation number of the APi is incremented (or counted), and in step ST3154, the observation number for the different intensity levels of the RSSIs of the APi is incremented (or counted), and the process advances to step ST316 illustrated in FIG. 16.

Returning now to the description of FIG. 16, in step ST316, a judgment is made to determine whether the process with respect to all APi is completed. The process returns to ST313 when the judgment result in step ST316 is NO, and the process advances to step ST317 when the judgment result in step ST316 is YES. In step ST317, the number of check-in data is counted, and the process returns to step ST311.

When all of the check-in data are processed and the judgment result in step ST311 becomes NO, in step ST318, the location at each location number of the location model 200 illustrated in FIG. 7 is scanned to compute the missing number of each AP, and the missing number is divided by the number of check-in data and normalized. In step ST319, the observation number of each AP is divided by the number of check-in data and normalized. In step ST320, the observation number of the intensity level of the RSSI of each AP is divided by the number of check-in data and normalized, and the process ends.

FIG. 18 is a flow chart for explaining an example of a location model (threshold information) learning process of the server. In step ST331 illustrated in FIG. 18, the check-in data is read from the check-in data file 300 within the storage unit of the server 21. In step ST332, a judgment is made to determine whether new check-in data exist, and when the judgment result in step ST332 is YES, the process advances to step ST333. When the judgment result in step ST332 is NO, the process advances to step ST335 which will be described later. When the new check-in data exist and the judgment result in step ST332 is YES, the check-in data (AP1(MAC, RSSI), . . . , APi(MAC, RSSI), . . . : location A) within a frame indicated by dotted lines are supplied to step ST333.

In step ST333, the second stage observation probability of the check-in data is computed by the above described method, based on the location model (probability information) and the global AP information list 100. After step ST333, the process returns to step ST331 on one hand to scan new check-in data, and the process advances in parallel to step ST334 on the other to store the store the second stage observation probability computed in step ST333 in the storage unit of the server 21 for each check-in location. In step ST335, after completing the process of step ST333 for all of the check-in data, the average and the standard deviation of the second stage observation probabilities are computed for each check-in location. In step ST336, the threshold value is computed for each location based on the average and the standard deviation computed in step ST335, to store the computed threshold value in the location model (threshold value information), and the process ends.

According to the embodiments described above, even when the number of locations increases, the increased location can be learned and added to the location model, thereby eliminating a need to relearn the learned locations. In addition, in a case in which positions of furniture, partitions, or the like change, for example, the location model on the server side can be updated based on the check-in data checked in from the mobile terminal side.

For example, when the mobile terminal is held at various orientations, the radio waves from a certain AP may no longer be receivable. In this case, because the radio waves cannot be received from the certain AP, the missing data is generated in the signals received from the certain AP, that is, in the RSSI observation vector, and a missing value is generated in the RSSI feature vector in such a case. The conventional method of creating the location model does not cope with the missing value in the RSSI feature vector, or takes insufficient measures to cope with the missing value in the RSSI feature vector, and for this reason, it is difficult to improve the location estimating accuracy.

For example, in the case of the parametric method and the non-parametric method, the missing value within the RSSI feature vector is ignored, and the missing probability is not reflected to the computation of the observation probability of the RSSI feature vectors. For this reason, the location estimating accuracy deteriorates in the case in which the missing value is generated.

In addition, in the case of the k-NN and the pattern matching method, for example, the missing value within the RSSI feature vector is generally substituted by a constant, an interpolation value based on past RSSI data, or the like. However, such a value that is substituted for the missing value greatly affects the computation of the distance between the RSSI observation vector and the sample of the database, and it is difficult to set the value that is substituted to an appropriate value. For this reason, in a case in which the missing value is generated, the location estimating accuracy deteriorates unless an appropriate value is substituted for the missing value.

On the other hand, according to the embodiments described above, the location can be estimated more accurately by utilizing the missing information of the AP, and the location can be estimated at a high speed by performing the 2-stage observation probability computation. In addition, by using the learned threshold value for each location, it is possible, for example, to output a judgment result indicating that the location of the mobile terminal is unknown.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile terminal communicable with a plurality of base stations, comprising:
    a storage unit configured to store a program; and
    a processor configured to execute the program to perform
        a position estimating process that includes
            narrowing down candidate positions of the mobile terminal estimated from signals received from the plurality of base stations, based on missing data of the signals received from a certain base station; and
            estimating a position of the mobile terminal from the narrowed down candidate positions, based on an observation probability of intensities of the signals received.

2. The mobile terminal as claimed in claim 1, wherein the narrowing down includes
    first computing a first stage observation probability based on an observation probability and a missing probability of the plurality of base stations, and
    second computing a second stage observation probability with respect to candidate positions having a first stage observation probability higher than a predetermined value, based on the observation probability of the intensities of the signals received and the missing probability of the plurality of base stations, and narrowing down a candidate location list to a location probability greater than or equal to a certain value.

3. The mobile terminal as claimed in claim 2, wherein the estimating includes judging, with respect to a candidate location having a maximum second stage observation probability, whether the mobile terminal is located at the candidate location having the maximum second stage observation probability.

4. The mobile terminal as claimed in claim 3, wherein the judging includes
    comparing, with respect to the candidate location having the maximum second stage observation probability, the second stage observation probability with a threshold value,
    judging the candidate location having the maximum second stage observation probability as the location of the mobile terminal when the second stage observation probability is greater than or equal to the threshold value, and judging that the location of the mobile terminal is unknown when the second stage observation probability is less than the threshold value.

5. A position estimating system comprising:
a mobile terminal as claimed in claim 2; and
a server communicable with the mobile terminal,
wherein the server includes an other processor configured to perform a process including
receiving check-in data from the mobile terminal and storing the check-in data in a check-in data file, and
performing a location model learning process by reading the check-in data from the check-in data file,
wherein the location model learning process includes two learning stages that are a learning of a probability information part of the location model, and a learning of a threshold value information part of the location model.

6. The position estimating system as claimed in claim 5, wherein the learning of the probability information part includes
learning a location model of a probability information part of the location model using the check-in data,
performing a second stage of a location estimating process with respect to the check-in data, based on the location model, when computing the second stage observation probability, and
learning a location model of a threshold value information part of the location model, by computing a threshold value of the second stage observation probability using the second stage observation probability obtained by the second stage of the location estimating process and a location name of a check-in location.

7. A position estimating method for estimating, by a computer, a position of a mobile terminal that is communicable with a plurality of base stations, comprising:
a narrowing-down procedure causing the computer to narrow down candidate positions of the mobile terminal estimated from signals received from the plurality of base stations, based on missing data of the signals received from a certain base station; and
an estimating procedure causing the computer to estimate a position of the mobile terminal from the narrowed down candidate positions, based on an observation probability of intensities of the signals received.

8. The position estimating method as claimed in claim 7, wherein the narrowing-down procedure includes
a first computing procedure causing the computer to compute a first stage observation probability based on an observation probability and a missing probability of the plurality of base stations, and
a second computing procedure causing the computer to compute a second stage observation probability with respect to candidate positions having a first stage observation probability higher than a predetermined value, based on the observation probability of the intensities of the signals received and the missing probability of the plurality of base stations, and narrow down a candidate location list to a location probability greater than or equal to a certain value.

9. The position estimating method as claimed in claim 8, wherein the estimating procedure includes a judging procedure causing the computer to judge, with respect to a candidate location having a maximum second stage observation probability, whether the mobile terminal is located at the candidate location having the maximum second stage observation probability.

10. The position estimating method as claimed in claim 9, wherein the judging procedure compares, with respect to the candidate location having the maximum second stage observation probability, the second stage observation probability with a threshold value, judges the candidate location having the maximum second stage observation probability as the location of the mobile terminal when the second stage observation probability is greater than or equal to the threshold value, and judges that the location of the mobile terminal is unknown when the second stage observation probability is less than the threshold value.

11. A non-transitory computer-readable storage medium having stored therein a program for causing a processor of a mobile terminal that is communicable with a plurality of base stations, to perform a position estimating process that estimates a position of the mobile terminal, the position estimating process comprising:
a narrowing-down procedure that narrows down candidate positions of the mobile terminal estimated from signals received from the plurality of base stations, based on missing data of the signals received from a certain base station; and
an estimating procedure that estimates a position of the mobile terminal from the narrowed down candidate positions, based on an observation probability of intensities of the signals received.

12. The non-transitory computer-readable storage medium as claimed in claim 11, wherein the narrowing-down procedure includes
a first computing procedure that computes a first stage observation probability based on an observation probability and a missing probability of the plurality of base stations, and
a second computing procedure that computes a second stage observation probability with respect to candidate positions having a first stage observation probability higher than a predetermined value, based on the observation probability of the intensities of the signals received and the missing probability of the plurality of base stations, and narrows down a candidate location list to a location probability greater than or equal to a certain value.

13. The non-transitory computer-readable storage medium as claimed in claim 12, wherein the estimating procedure includes a judging procedure for judging, with respect to a candidate location having a maximum second stage observation probability, whether the mobile terminal is located at the candidate location having the maximum second stage observation probability.

14. The non-transitory computer-readable storage medium as claimed in claim 13, wherein the judging procedure compares, with respect to the candidate location having the maximum second stage observation probability, the second stage observation probability with a threshold value, judges the candidate location having the maximum second stage observation probability as the location of the mobile terminal when the second stage observation probability is greater than or equal to the threshold value, and judges that the location of the mobile terminal is unknown when the second stage observation probability is less than the threshold value.

* * * * *